April 21, 1964     O. C. MILLER     3,129,937
ANGULARLY ADJUSTABLE LOCKING TRUNNION
Filed June 20, 1962
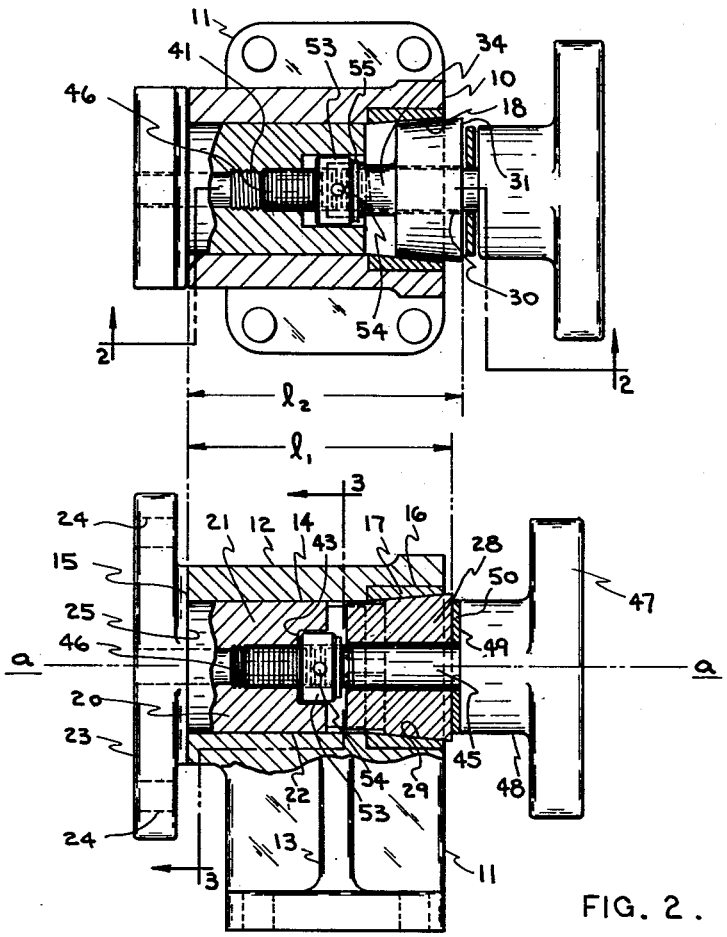
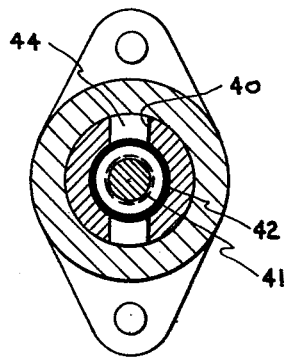
FIG. 3.
INVENTOR.
ORVILLE C. MILLER
BY
HIS ATTORNEY

3,129,937
ANGULARLY ADJUSTABLE LOCKING TRUNNION

Orville C. Miller, Maplewood, Mo., assignor to Carr Lane Manufacturing Co., Maplewood, Mo., a corporation
Filed June 20, 1962, Ser. No. 203,902
7 Claims. (Cl. 269—74)

This invention relates to trunnions used for fixtures in the manufacture of large workpieces, such as aircraft parts, which must be turned or set at different angles during the course of manufacture. Specifically, it relates to a trunnion which may be adjusted angularly and tightened securely in any chosen angular position. For manufacturing small workpieces, no other trunnion may be necessary; for larger workpieces it is convenient to use trunnions in pairs, establishing a common axis; and trunnions such as those described hereafter may be used at either or both ends of the axis.

Heretofore, it has been common practice to utilize trunnions of the freely rotatable variety, locking them by pinning the workpiece-holding flange of the trunnion to some portion of the trunnion body or to some other fixed member. However, pinning permits only a small number of angular positions. To provide an infinite choice of angular position, one form of trunnion includes a brake which tightens about the trunnion shaft. Such trunnions may not lock safely because of the inadequacy of brake friction available.

In its preferred embodiment, the present invention consists in providing a fixture trunnion having a housing which establishes its rotative axis, and having rotative portions including a workpiece-supporting portion, but with the following new features: the housing includes a conical seat; and the rotative portions include a cone portion and an axially-shortenable connection to the shaft which transmits twist to the cone portion. When the axially-shortenable connection is shortened and tightened (by a handle provided for this purpose), twist-resisting friction is exerted against the conical seat of the housing. Such friction is released when the connection is again lengthened. The seating of the cone portion in its conical seat is so secure that mechanical means are used to unseat the cone portion as the connection is lengthened.

In the drawing, FIGURE 1 is a view from above, partly in horizontal section, of a trunnion embodying the present invention. FIGURE 2 is a sectional view taken along line 2—2 of FIGURE 1; and FIGURE 3 is a transverse section taken along line 3—3 of FIGURE 2.

The housing shown in the drawing is generally designated 10. It includes a mounting portion or base 11 and a generally cylindrical body portion 12, together with integral supporting webs 13 on each side. The body portion 12 has an internal cylindrical bearing surface 14, described about an axis $a$—$a$. The end of the housing 10 at the left side of the drawing is referred to as its axially-inner end, because it is the end nearest which the workpiece is supported. This end of the housing is machined perpendicular to the axis $a$—$a$ to provide a thrust-resisting face 15.

Set within the enlarged bore 16 at the axially-outer end of the housing 10 is a seat insert 17 formed of brass or other material chosen for its wear properties. The insert 17 has an inner conical seat surface 18 which serves as a twist-resisting seat for the trunnion.

In order to support a typical workpiece which is to be rotated to various angular positions, a rotative member generally designated 20 is provided. It includes a shaft 21 having an outer cylindrical bearing surface 22 mounted within the internal cylindrical bearing surface 14 of the housing 10. If formed as a casting as shown in the drawing, the rotative member may have an integral flange 23 shown as elliptical and including a pair of parallel spaced bores 24 to serve for mounting a workpiece, not shown. The axially-outer flange is machined to provide an annular thrust face 25 presented against the thrust-resisting face 15 of the housing 10.

A locking assembly for the trunnion includes a truncated cone, generally designated 28, whose conical surface 29 is complementary to the conical seat 18 of the insert 17. The cone 28 has a clearance bore 30 drilled along its axis, which in the assembly is concentric with the axis $a$—$a$. The axially-outer end surface 31 of the cone 28 is machined perpendicular to its axis.

For transmitting twist from the shaft 21 the cone 28 is provided at its axially-inner end with parallel sided tangs 34 on both sides of its clearance bore 30 but preferably narrower than its diameter. The tangs 34 are spaced at 180° from each other, so that their parallel sides may move axially inward and outward in sliding relationship between parallel walls of a diametral slot 40. The tangs 34 and slot 40 thus serve as a tang-and-slot connector means between the shaft 21 and the cone 28; and their axially-sliding fit provides for transmitting twist from the rotative member 20 to the cone 28, to be reacted by friction when the cone 28 is seated within the conical seat 18.

To tighten the cone 28 against the conical seat 18, a manual adjusting means is provided. Referring to FIGURE 3, the diametral slot 40 is interrupted at its center by an axial bore 41, which is tapped and is of smaller diameter than the clearance bore 30. At its axially-outer end an enlarged counter-bore 42 is provided, whose annular base 43 is substantially perpendicular to the axis $a$—$a$ and whose base lies axially inward of the base 44 of the slot 40.

The manual adjusting means utilizes (and therefore is in effect comprised in part of) the clearance bore 30 in the cone 28. In the illustrated embodiment a rod 45 extends through the clearance bore 30 into the tapped bore portion 41 where the rod 45 is provided with a complementarily threaded axially-inner end 46. At its axially-outer end the rod 45 has a handle 47 projecting from a shank 48 which has at its axially-inner side a thrusting face 49 adapted to bear through a washer 50 against the axially-outer end surface 31 of the cone 28. By such bearing, a seating force is exerted by the cone 28 against the conical seat surface 18.

The seating surfaces 18 and 29 are so precisely machined that it has been found necessary to provide a positive force to unseat them. To solve this problem I provide unseating means illustrated, including a collar 53 securely mounted by a taper pin 54 on a rod 45. As shown in FIGURE 3, the collar 53 will lie at least partly within the clearance well.

A washer 55 at the axially-outer side of the collar 53 bears against the axially inward-projecting ends of the tangs 34 when the cone is unseated as shown in FIGURE 1.

A comparison should be made of the trunnion free length $l_2$ of FIGURE 1, with its locked length $l_1$ of FIGURE 2. By its very nature, a non-locking fixture trunnion reacts all forces exerted on the workpiece except twist about the trunnion axis. The new function is to resist such twist firmly, at any angular setting. The conical twist-resisting seat 18 could not react twist unless the means which would apply friction to it—the cone surface 29—is firmly seated against it.

The tang-and-slot connector means, consisting generally of the tangs 34 and the slot 40, will transmit strong twist forces from the shaft 21 provided such forces can be reacted. This is achieved by axially shortening the tangand-slot connector through the manual adjusting means described by merely turning the handle 47 to screw the rod end 46 more deeply into the tapped bore 41. As the thrusting face 49 is pressed axially inward, the tangs 34 move into the slot 40 until the cone 28 is firmly seated. The friction exerted by its conical surface 29 against the friction reacting conical seat 18 locks the trunnion and prevents accidental movement from forces applied to the workpiece.

Turning the handle 47 in the opposite sense thrusts the collar 53 axially outward. The thrust is transmitted by the washer 55 to the axially inner ends of the tangs 34 moving the cone 28 axially outward back to the free length $l_1$ of FIGURE 1 and positively releasing the frictional locking.

By the present invention, I have provided an axially-shortenable trunnion with conical seating by which strong friction is exerted to overcome forces applied on the workpiece. So securely does this friction lock the trunnion that I also provide the collar 53 and associated mechanisms to positively unseat the cone 28 and lengthen the rotative assembly to a freely turnable length.

Modifications of the embodiment illustrated will occur to those familiar with the problems of designing trunnions and fixtures. Accordingly, the invention is not to be construed narrowly, but rather as fully co-extensive with the claims hereof.

I claim:

1. An angularly adjustable twist-resisting trunnion, comprising
    a housing including a mounting portion and an internal cylindrical bearing surface therein, a thrust-resisting face at the axially-inner end thereof, and a conical twist-resisting seat at the axially-outer end thereof,
    together with a rotative member including a shaft having a cylindrical bearing surface within the housing, and having at its axially-inner end a workpiece-mounting flange including an annular thrust face presented to bear against the thrust face of the housing,
    together further with a locking assembly including a truncated cone having a surface complementary to the conical seat of the housing,
    tang-and-slot connector means between the cone and shaft, and
    manual adjusting means to bring the tang-and-slot connector means into deeper engagement, thereby tightening the cone within its seat.

2. A twist-resisting trunnion as defined in claim 1, the tang-and-slot connector means consisting of a pair of 180°-spaced tangs projecting axially from the axially-inner end of the cone and a diametral slot across the shaft end of sufficient width to receive said projecting tangs in axially-sliding relationship.

3. A twist-resisting trunnion as defined in claim 1, the manual adjusting means comprising
    a tapped bore within the shaft,
    a clearance bore in the cone, and
    a rod extending through the clearance bore and having a threaded end engaging the tapped bore of the shaft, the rod having at its outer end a handle and a thrusting face at the axially inner side of the handle, whereby to exert a seating force against the axially-outer end of the cone.

4. A twist-resisting trunnion as defined in claim 3, together with means to unseat the cone from the seat.

5. A twist-resisting trunnion as defined in claim 4, the said means to unseat the cone comprising a collar mounted on the rod axially inward of the cone.

6. An angularly adjustable twist-resisting trunnion, comprising
    a housing including a mounting portion and an internal cylindrical bearing surface thereon, a thrust-resisting face at the axially-inner end thereof, and a conical twist-resisting seat at the axially-outer end thereof,
    together with a rotative member including a shaft having a cylindrical bearing surface within the housing, and having at its axially-inner end a work-piece mounting flange including an annular thrust face presented to bear against the thrust face of the housing,
    together further with a locking assembly including at its axially-outer end a truncated cone having a surface complementary to the conical seat of the housing,
    axially-shortenable twist-transmitting connector means connecting said cone and said shaft, and
    manual adjusting means to axially shorten and lengthen said connector means, whereby, on shortening same, to seat the cone and thus resist twist imposed upon the workpiece mounting flange.

7. A twist-resisting trunnion as defined in claim 6, together with means engaged by said manual adjusting means to unseat said cone when the axially-shortenable connection is lengthened.

References Cited in the file of this patent

UNITED STATES PATENTS

| | | |
|---|---|---|
| 1,132,320 | Fegley et al. | Mar. 16, 1915 |
| 1,223,355 | Baltenweiler et al. | Apr. 24, 1917 |
| 1,600,835 | Manley | Sept. 21, 1926 |
| 2,495,801 | Ammons | Jan. 31, 1950 |

FOREIGN PATENTS

| | | |
|---|---|---|
| 781,579 | France | Feb. 25, 1935 |

UNITED STATES PATENT OFFICE

CERTIFICATE OF CORRECTION

Patent No. 3,129,937                                April 21, 1964

Orville C. Miller

It is hereby certified that error appears in the above numbered patent requiring correction and that the said Letters Patent should read as corrected below.

Column 3, line 14, for "length $l_1$" read -- length $l_2$ --.

Signed and sealed this 4th day of August 1964.

(SEAL)
Attest:

ERNEST W. SWIDER
Attesting Officer

EDWARD J. BRENNER
Commissioner of Patents